Patented July 15, 1952

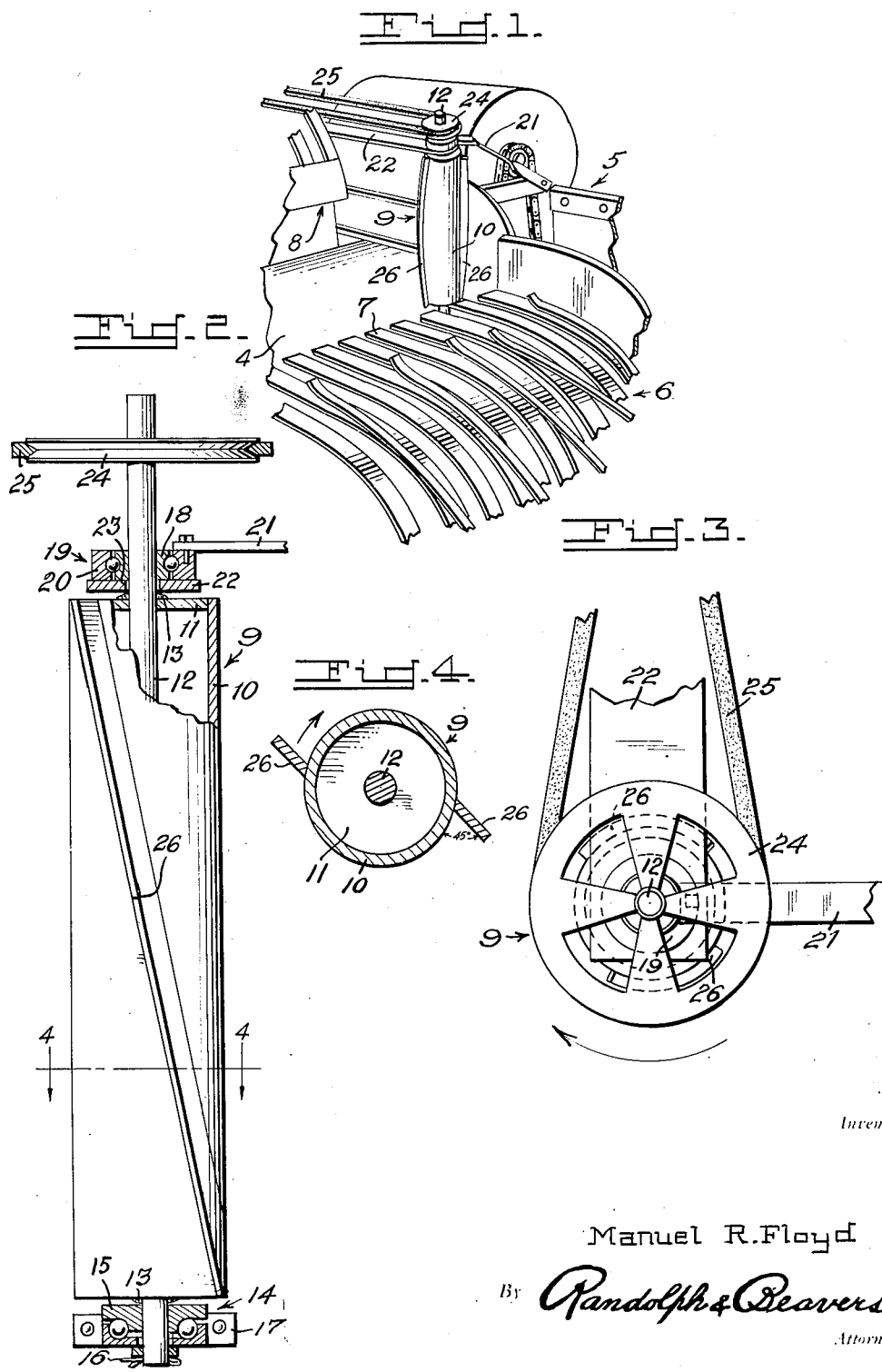

2,603,144

UNITED STATES PATENT OFFICE 2,603,144

FEEDER BOOSTER

Manuel R. Floyd, La Fayette, Ind.

Application November 28, 1947, Serial No. 788,588

1 Claim. (Cl. 100—189)

This invention relates to mechanism for producing more positive feed of and preventing the clogging of material in such apparatus as pick-up balers and the like, and the primary object of the invention is to provide simple, efficient, and serviceable feeder mechanism of this character which can be installed as original equipment or as an attachable accessory.

Another important object of the invention is to provide a booster roter to be installed at the point in the baler or the like apparatus at which the material picked-up in the operation of the apparatus reaches the delivery terminal of the feeding mechanism and makes a right angle turn to enter the baling chamber, whereby the material, which otherwise has a tendency to accumulate and clog at this point, is positively prevented from so doing.

Other important objects and advantageous features of this invention will be apparent from the following description and the drawings appended thereto, wherein, for purposes of illustration only, one specific embodiment is set forth.

In the drawings:

Figure 1 is a fragmentary perspective view showing one embodiment of the invention in a pick-up baler.

Figure 2 is an enlarged side elevation of the booster roller, with a portion broken away and in section to show structural details.

Figure 3 is a top plan view of Figure 2, and

Figure 4 is a horizontal section taken along the line 4—4 of Figure 2.

Referring in detail to the drawings, the numeral 5 generally designates a conventional pick-up baler, having the feeding mechanism 6 whose upper or delivery end 7 terminates at the side entrance 8 of a baling chamber, in which a baling ram (not shown) operates and which entrance 8 extends at right angles to the feeding mechanism, including a transverse feeder belt 4, in view of which arrangements the material (not shown) delivered at the upper end 7 of the feeding mechanism makes a 90° turn toward the drum (not numbered) in Figure 1 upon entering the baling chamber 8, in front of the ram. In making this turn the material has a tendency to accumulate at the upper end 7 of the feeding mechanism and the right hand side of the baling chamber entrance, as viewed in Figure 1, and thereby clog the apparatus and require stopping of the apparatus and manual clearance of the clogged material, with consequent loss of time and labor.

In accordance with the present invention the described clogging and accompanying work stoppages are eliminated by installing at the point of clogging a specially constructed booster roller 9, which is arranged on a vertical axis at the corner of the turn made by the material at the point represented by the upper end 7 of the feeding mechanism and, in this instance, the right hand edge of the side opening of the baling chamber 8.

The booster roller 9 comprises a hollow metal cylinder 10, such as a 20 inch length of 4 inch pipe, with its ends closed by disks 11, through the centers of which a shaft 12 extends and to which the shaft is welded or otherwise fixedly secured, as indicated at 13.

The lower end of the shaft 12 is mounted in a pillow type antifriction thrust bearing 14, with the weld 13 bearing upon the upper and rotatable member 15 of said bearing, a washer and cotter key arrangement 16 being used on the lower extremity of the shaft to hold the roller in place in the bearing 14. This bearing may have apertured ears 17 or other suitable means enabling it to be fixedly mounted to a portion of the baler or like apparatus, in the location already described above.

Above the weld 13 on the upper end of the shaft 12, there is fixed thereon the inner element 18 of an antifriction bearing 19, whose outer element 20 is braced for correct positioning of the roller by a light brace 21 which is fixed to an adjacent part of the baler, as shown in Figure 1. The outer bearing element 20 is fixed to a horizontal elongated plate-like arm 22, apertured at 23 to freely pass the shaft 12 between the element 20 and the upper weld 13, which arm extends across the top of the baling chamber and is rigidly anchored to a suitable part (not shown) of the baler 5.

A belt pulley 24 is fixed on the shaft 12 above the upper bearing 19 and has a V-belt 25 whose flights extend in the direction of elongation of the arm 22 and which is trained over another belt pulley (not shown) arranged in line with the arm 22, so that the arm 22 resists the pull of the belt 25, and driven by a suitable part of the operating mechanism (not shown) of the baler 5.

As shown in Figures 2 and 4, the exterior of the roller cylinder 10 is provided on diametrically opposite sides with spiral vanes 26, which extend the length of the cylinder and for a 20 inch cylinder of 4 inch diameter, these vanes are preferably one-eighth of an inch in thickness and three-fourths of an inch in depth. The vanes 26 are pitched at an angle of about 45° to a diameter of the cylinder passing through the point of attachment of the vane to the cylinder in a direction of rotation, as indicated in Figure 4. The vanes are inclined at an angle of about 8° with respect to the axis of the cylinder 10.

In operation, as the material picked up by the operation of the baler 5 reaches the upper end 7 of the feeding mechanism 6 to enter the baling chamber 8 in a 90° right hand turn, the booster roller 9 acts upon the material around the turn and into the baling chamber, thereby positively precluding the time and labor wasting clogging mentioned hereinabove.

The term "roller" herein is used, unless otherwise stated, in its broadest sense and such roller may partake of various forms and shapes and be of the closed or open-work type, that is, a tube (cylindrical or otherwise) or a reel.

I claim:

In combination, a pick-up baler having a material feeding mechanism and a baling chamber provided with a side opening at which the upper or delivery end of said feeding mechanism terminates, said baling chamber opening extending at right angles to said feeding mechanism whereby the picked-up material delivered at the upper end of the feeding mechanism makes a right angle turn in entering said baling chamber, a booster roller positioned on said baler at the delivery end of said feeding mechanism and at the side of said baling chamber opening toward which the material turns in entering the baling chamber whereby accumulation of the material at the said side of the baling chamber opening is positively prevented and movement of the material into the baling chamber is accelerated, said roller comprising a vertically disposed cylinder having longitudinally extending spiral vanes on the sides thereof, said roller being positioned close to the said side of the baling chamber side opening, and means driven from the baler for rotating said roller on the axis while said feeding mechanism is in operation, said vanes each forming substantially a 45° angle to a tangent to the surface of the cylinder at the point of juncture therewith and in the direction of rotation.

MANUEL R. FLOYD.

REFERENCES CITED

The following references are of record in the file of this patent:

UNITED STATES PATENTS

| Number | Name | Date |
|---|---|---|
| 1,758,557 | Bullock | May 13, 1930 |
| 2,038,809 | Tallman | Apr. 28, 1936 |
| 2,335,764 | Innes | Nov. 30, 1943 |